United States Patent Office 3,439,099
Patented Apr. 15, 1969

3,439,099
STIMULATION OF FLOW OF BILE BY SUBSTITUTED CYCLOALKANE-ALKANOIC ACIDS
Raffaello Fusco, Milan, and Franco Tenconi, Monza, Milan, Italy, assignors, by mesne assignments, to Warner-Lambert Pharmaceutical Company, Morris Plains, N.J., a corporation of Delaware
No Drawing. Filed Apr. 27, 1964, Ser. No. 362,959
Claims priority, application Italy, Apr. 29, 1963, 34,493
Int. Cl. A61k 27/00
U.S. Cl. 424—317                5 Claims The present invention relates to novel choleretic compositions and to certain novel chemical compounds which may be included in such compositions having prolonged choleretic effects.

More particularly this invention relates to compositions containing as active ingredients 1-substituted cycloalkane-alkanoic acids represented by the following general formula:

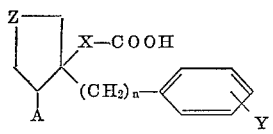

wherein X represents an alkylene chain of from 1 to 4 carbon atoms which may optionally be substituted by lower alkyl groups, Z represents methylene or ethylene, A represents ketonic oxygen or a hydroxy group, Y is hydrogen, halogen such as chloro or fluoro, or alkoxy group containing from 1 to 3 carbon atoms in the alkyl group and $n$ has the value 0 or 1; or their equivalent therapeutically acceptable salts or their non-toxic lower alkyl esters.

The salts of said carboxylic acids are advantageously those containing a pharmaceutically acceptable metal anion such as alkali metal or alkaline earth metal salts, for example sodium, potassium, calcium and magnesium salts. Suitable salts are also those with organic bases, particularly amines such as mono- and di-lower alkylamines, for example the salts with diethylamine.

Exemplary of the new cycloalkane α-substituted alkanoic acids of this invention are:

2-oxo-1-benzyl-cyclohexane propionic acid;
2-oxo-1-benzyl-cyclopentane propionic acid;
2-oxo-1-(o-chloro-phenyl)-cyclohexane acetic acid;
2-oxo-1-(p-chloro-phenyl)-cyclohexane acetic acid;
2-oxo-1-(o-methoxy-phenyl)-cyclohexanepropionic acid;
2-oxo-1-phenyl-cyclopentane acetic acid;
2-oxo-1-phenyl-cyclohexane isobutyric acid;
2-oxo-1-benzyl-cyclohexane-(β-methyl)-propionic acid;
2-oxo-1-(o-chlorobenzyl)-cyclohexane isobutyric acid;
2-oxo-1-(p-chlorobenzyl)-cyclopentane butyric acid;
2-oxo-1-(p-methoxy-phenyl)-cyclopentane isobutyric acid;
2-oxo-1-benzyl-cyclohexane acetic acid;
2-oxo-1-benzyl-cyclohexane isobutyric acid;
2-oxo-1-benzyl-cyclohexane butyric acid;
2-oxo-1-phenyl-cyclohexane butyric acid;
2-hydroxy-1-phenyl-cyclopentane acetic acid;
2-hydroxy-1-benzyl-cyclopentane propionic acid;
2-hydroxy-1-phenyl-cyclohexane acetic acid;
2-hydroxy-1-benzyl-cyclohexane propionic acid;
2-hydroxy-1-(p-chlorobenzyl)-cyclopentane acetic acid;
2-hydroxy-1-(p-ethoxybenzyl)-cyclopentane acetic acid;
2-hydroxy-1-benzyl-cyclohexane isobutyric acid;
2-hydroxy-1-(o-chlorobenzyl)-cyclopentane propionic acid;
2-hydroxy-1-(o-methoxy-benzyl)-cyclopentane propionic acid;
and the salts and esters thereof.

We have discovered that the 1-substituted cycloalkane-alkanoic acids of this invention and salts and esters thereof possess useful chloreretic properties. These compounds, employed in the novel compositions and administered as hereinafter outlined, are pure choleretic agents as they stimulate the flow of bile, increasing the liberation of both liquid and solid constituents without affecting their proportion.

The compounds of this invention show also the advantage of a sustained and prolonged choleretic action; they are non-toxic, non-cholecystokinetic and tolerance does not develop to these agents. A particularly pronounced choleretic activity is realized with certain new 1-substituted cycloalkane alkanoic acids coming within the broad definition given above, these compounds being:

2-oxo-1-benzyl-cyclohexane propionic acid;
2-oxo-1-(o-methoxy-benzyl)-cyclohexane propionic acid;
2-hydroxy-1-phenyl-cyclohexane acetic acid;
2-hydroxy-1-phenyl-cyclopentane acetic acid;
and salts and esters thereof.

A preferred and advantageous compound is 2-oxo-1-benzyl-cyclohexane propionic acid or its sodium or diethylamine salt.

The compositions of this invention are in dosage unit form comprising a non-toxic pharmaceutical carrier and at least one cycloalkane-1-substituted alkanoic acid or salts or esters thereof.

The pharmaceutical carrier may be any acceptable, solid or liquid, diluent suitable for oral, parenteral or intraduodenal application, such as calcium or magnesium carbonate, lactose, maize, starch, magnesium stearate, talc, sucrose, agar, sterile water, ethanol and ethylene or propylene glycol. Thus the compositions may be formulated according to the known art as tablets pills, capsules, syrups, sterile solutions or suspensions or other dosage forms suitable for oral, parenteral or intraduodenal administration. Generally the compositions contain the active ingredient in an amount of from 10 to 300 mg. preferably from 30 to 100 mg. per dosage unit. The administration is advantageously in equal doses one or more times daily to give a daily dosage of from 30 to 900 mg. and preferably from 50 to 300 mg.

The compositions can also contain other therapeutic substances for example liver-protecting agents including vitamins of the B group, parasympatholytic agents and enzymes.

The 1-substituted cycloalkane-alkanoic acids of this invention are obtained by treating compounds of the formula:

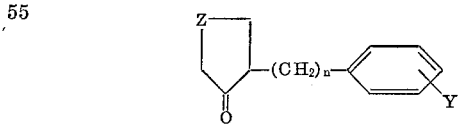

where Y, Z and $n$ are as defined above with a cyanalkylating or carbalkoxyalkylating agent in the presence of a basic condensing agent and saponifying the resulting product in order to obtain the corresponding cycloalkanone-alkanoic acid. By submitting this product to treatment with a reducing agent according to the known methods for converting a keto-group to a hydroxy group such as lithium aluminum hydride or sodium borohydride, the corresponding cycloalkanol-alkanoic acid is prepared. Said carboxylic acid derivatives are converted to the corresponding salts by treatment with the appropriate organic or inorganic base according to standard procedures for salt formation.

The invention is illustrated but not limited by the following examples.

Example 1

To a solution of 10 g. of α-(o-chlorobenzyl)-cyclohexanone in 80 cc. of dioxane and 1 cc. of benzyltrimethylammonium hydroxide there is added, under stirring at room temperature, a solution of 3.6 g. of acrylonitrile in 10 cc. of dioxane. After 2 hours at 45–50° C. the solvent is evaporated and the residue distilled under vacuum. The fraction collected at 165–168° C./0.2 mm. Hg yields 2-oxo-1-(o-chlorobenzyl)-cyclohexane propionitrile.

2 g. of this nitrile are heated under reflux with 20 cc. of 20% aqueous potassium hydroxide solution until the evolution of ammonia ceases. After cooling, the reaction mixture is extracted with ether and the aqueous phase is acidified by addition of hydrochloric acid. The resulting mixture is extracted with ether and the ethereal phase is washed with water, dried over sodium sulfate and evaporated. The dense oily residue, after crystallization from anhydrous ligroin gives 2-oxo-1-(o-chlorobenzyl)-cyclohexane propionic acid. M.P. 106–108° C.

Example 2

By treating as in Example 1 a dioxane solution of 15 g. of acrylonitrile with 35 g. of α-benzyl-cyclohexanone in the presence of benzyltrimethylammonium hydroxide there is obtained 2-oxo-1-benzylcyclohexane propionitrile; B.P. 155–158° C./0.2 mm. Hg. This compound is heated to reflux with a mixture in equal parts of glacial acetic acid and concentrated hydrochloric acid for ten hours. The reaction mixture is then evaporated under vacuum and the residue dissolved in 10% aqueous sodium hydroxide solution.

After extraction with ether, the aqueous phase is acidified by addition of hydrochloric acid. The oily acid is extracted with ether and the ethereal extracts are washed with water, dried and evaporated to give 2-oxo-1-benzyl-cyclohexane propionic acid as raw material. The compound is purified by physical or chemical methods to give the pure product melting at 65–67° C.

To a solution of 2.6 g. of 2-oxo-1-benzylcyclohexane propionic acid in 10 cc. of anhydrous ether is added 1.1 g. of anhydrous diethylamine, to form the diethylamine salt of 2-oxo-1-benzyl-cyclohexane propionic acid, M.P. 71–72° C.

Example 3

A solution of 8.6 g. of methyl acrylate in 10 cc. of anhydrous dioxane is added dropwise with stirring to a mixture of 18.8 g. of α-benzyl-cyclohexanone, 100 cc. of anhydrous dioxane and 5 cc. of 40% methanolic benzyltrimethylammonium hydroxide solution. The reaction mixture is stirred for 4 hours, the solvent is then evaporated under vacuum at low temperature and the residue is distilled under vacuum to obtain methyl 2-oxo-1-benzyl-cyclohexane propionate as a colourless oil: B.P. 145–147° C./0.2 mm. Hg.

By substituting in the above reaction ethyl acrylate for methyl acrylate, the corresponding ethyl 2-oxo-1-benzyl-cyclohexane propionate is prepared. This compound is heated with aqueous sodium hydroxide solution After cooling the reaction mixture is acidified with hydrochloric acid and extracted with ether. The ethereal extracts are washed with water and dried over sodium sulfate. After evaporation of the solvent the residue is treated as described in Example 2 to obtain 2-oxo-1-benzyl-cyclohexane propionic acid. This product, treated with sodium hydroxide, gives the water-soluble sodium salt.

Example 4

161 g. of 2-oxo-1-benzyl-cyclohexane propionic acid dissolved in 620 cc. of sodium hydroxide N are treated, with stirring, at 40° C., with 68 g. of $CaCl_2 \cdot 6H_2O$. The resulting precipitate is filtered, washed with water and dried at 55° C. to obtain 107 g. of calcium salt of 2-oxo-1-benzenyl-cyclohexane propionic acid.

Example 5

A solution of 16.6 g. of acrylonitrile in 20 cc. of anhydrous dioxane is added, with stirring, to a mixture of 36.25 g. of α-benzyl-cyclopentanone and 8 cc. of 40% methanolic benbyltrimethylammonium hydroxide solution in 200 cc. of dioxane.

By following the method described in Example 1, the 2-oxo-1-benzyl-cyclopentane propionic acid is obtained. M.P. 74–76° C.

Example 6

To a mixture of 5 g. of 2-phenyl-cyclohexanone, 40 cc. of anhydrous dioxane and 2.5 cc. of 40% methanolic solution of benzyltrimethylammonium hydroxide there is added 3.4 g. of crotononitrile in 5 cc. of anhydrous dioxane. After 2 hours at 40° C. the mixture is evaporated and the residue distilled under vacuum to obtain β-(2'-oxo-1'-phenyl-cyclohexane)-(β-methyl)-propionitrile in a yield of 65%; B.P. 135–140° C./0.01 mm. Hg.

A solution of 5 g. of β-(2'-oxo-1'-phenyl-cyclohexane)-(β-methyl)-propionitrile, 5 cc. of glacial acetic acid and 50 cc. of concentrated hydrochloric acid is heated under reflux under nitrogen atmosphere for 12 hours. The mixture is then evaporated and the residue taken up with concentrated sodium hydroxide. After filtration and acidification with hydrochloric acid, the mixture is extracted with ether and the ethereal extracts evaporated. The residue is distilled and the fraction boiling at 155–160° C./0.05 mm. Hg is taken up with 5% sodium bicarbonate, then is filtered and acidified with hydrochloric acid to give β-(2'-oxo-1'-phenyl - cyclohexane)-(β - methyl)-propionic acid which after crystallization from hexane-benzene melts at 165–167° C.

Example 7

A mixture of 25 g. of 2-phenyl cyclopentanone in 35 cc. of anhydrous ether and 16 cc. of anhydrous benzene is quickly dropped into a suspension of 6.5 g. of sodamide in 85 cc. of anhydrous ether and the resulting mixture is heated under reflux until the evolution of ammonia ceases.

35 g. of ethyl bromoacetate in 40 cc. of anhydrous ether are added, drop by drop, into the mixture which is heated under reflux for 3 hours, poured into water and extracted with ether. The ethereal extracts are dried and evaporated to obtain a residue which is distilled. The fraction passing over at 127–130° C./0.1 mm. Hg gives ethyl 2-oxo-1-phenyl-cyclopentane acetate.

A solution of 1 g. of ethyl 2-oxo-1-phenyl-cyclopentane acetate in 25 cc. of 25% sodium hydroxide is heated under reflux for 4 hours. Then the mixture is acidified with hydrochloric acid, extracted with benzene, dried and filtered. The oily residue is evaporated then it is distilled under vacuum and the fraction which passes over at 150° C./0.1 mm. Hg gives the raw 2-oxo-1-phenyl-cyclopentane acetic acid. After extraction with anhydrous ethyl ether, filtration and crystallization from benzene and ligroin the pure acid is obtained; M.P. 81–83° C.

Example 8

A mixture of 2.2 g. of 2-oxo-1-phenyl-cyclopentane acetic acid obtained as described in Example 7, 40 cc. of water and 0.42 g. of sodium hydroxide, is treated, drop by drop, at room temperature with a solution of 0.2 g. of sodium borohydride in 20 cc. of water. The temperature is maintained at 55–60° C. during a period of 5 hours after which it is acidified and extracted with ether. The ethereal extracts are collected and evaporated. The oily residue is taken up with 5% sodium bicarbonate. After filtration and extraction with ether the aqueous phase is acidified with hydrochloric acid and the oily precipitate is taken up several times with ligroin until complete crystallization to obtain the 2-hydroxy-1-phenyl-cyclopentane acetic acid; M.P. 97–98° C.

Example 9

In the same manner as described in the preceding examples, the following 1-substituted cycloalkane-alkanoic acids are prepared:

2-oxo-1-phenyl-cyclohexane acetic acid
2-oxo-1-(o-methoxy-phenyl)-cyclohexane propionic acid, M.P. 73° C.
2-oxo-1-phenyl-cyclopentane propionic acid, M.P. 97–98° C.
2-oxo-1-(p-chlorobenzyl)-cyclohexane propionic acid, M.P. 103–105° C.
2-oxo-1-(o-chlorobenzyl)-cyclohexane isobutyric acid, M.P. 106–108° C.
2-oxo-1-(o-methoxy-benzyl)-cyclopentane propionic acid, M.P. 83–84° C.
2-oxo-1-(o-chlorobenzyl)-cyclopentane propionic acid, M.P. 99–101° C.
2-oxo-1-(p-chlorobenzyl)-cyclopentane propionic acid, M.P. 85–87° C.
2-hydroxy-1-(o-methoxy-benzyl)-cyclopentane propionic acid, M.P. 163–164° C.
2-hydroxy-1-(o-chlorobenzyl)-cyclopentane propionic acid, M.P. 131–132° C.

Example 10.—Pharmacological testing

The choleretic activity of the compounds of this invention was evaluated utilising the biliary fistula assay on male rats weighing about 300 g. A cannula was inserted into the ductus choledochus of the animals subjected to fasting from the evening preceding the observation (water ad libitum) and under urethan narcosis (1.5 g./kg.).

After determining the basal flow, the choleretic agent was administered orally in aqueous solution at the dose of 100 mg./kg. The biliary flow was measured every hour for six hours after the administration of the compound and expressed as variation percent with respect to the basal flow taken as 100.

The results reported in the table show the choleretic action of some of the more representative compounds of the invention in comparison with dehydrochloric acid.

TABLE

| Hours | 1 | 2 | 3 | 4 | 5 | 6 |
| --- | --- | --- | --- | --- | --- | --- |
| Dehydrocholic acid | 169 | 145 | 130 | 115 | 110 | 105 |
| 2-oxo-1-benzyl-cyclohexane propionic acid | 253 | 220 | 174 | 154 | 142 | 119 |
| Sodium salt of 2-oxo-1-benzyl-cyclohexane propionic acid | 255 | 225 | 180 | 160 | 140 | 125 |
| Diethylamine salt of 2-oxo-1-benzyl-cyclohexane propionic acid | 240 | 200 | 190 | 180 | 160 | 150 |
| Diethylamine salt of 2-oxo-1-(o-methoxy-benzyl)-cyclohexane propionic acid | 218 | 206 | 211 | 165 | 149 | 127 |
| Diethylamine salt of 2-oxo-1-(o-chloro-benzyl)-cyclohexane propionic acid | 230 | 169 | 130 | 123 | 123 | 107 |
| Sodium salt of 2-hydroxy-1-phenyl-cyclohexane acetic acid | 281 | 218 | 193 | 162 | 156 | 137 |

Example 11

An emulsion for oral administration is prepared from the following types and amounts of ingredients:

|  | G. |
| --- | --- |
| Sodium 2-oxo-1-benzyl-cyclohexane propionate | 0.3 |
| Liver extract | 1.2 |
| Cascara extract | 0.8 |
| Rhubarb extract | 4 |
| Alcohol | 10 |
| Glycerin | 10 |
| Methyl p-hydroxy benzoate | 0.10 |
| Dextrose | 22 |
| Polisorbate 80 | 8 |

Water is added to the mixture up to a volume of 100 cc., thus obtaining an emulsion.

Example 12

A solution is prepared by dissolving 2.5 g. of 2-oxo-1-benzylcyclohexane propionic acid methyl ester in 100 cc. of ethanol and water. Vitamin $B_{12}$ is then added in an amount of 150 mcg. thus providing a solution suitable for oral administration by drops for therapeutic purposes.

Example 13

Tablets containing 30 mg. each of active compound are prepared by mixing the appropriate quantity of 2-oxo-1-benzyl-cyclohexane propionic acid with lubricants such as calcium stearate or magnesium stearate and with diluents such as corn starch, lactose or powdered sucrose to form a homogenised mixture which is then compressed into tablets.

Example 14

Capsules for oral administration are prepared by filling into gelatin capsules 50 mg. of 2-oxo-1-benzyl-cyclohexane propionic acid or its calcium salt. The active compound can be mixed with diluents such as, for example, powdered lactose, powdered sucrose and the mixture filled into soft gelatin capsules.

Example 15

Tablets are prepared with the following ingredients: diethylamine salt of 2-oxo-1-benzyl-cyclohexane propionic acid (150 mg.), lactose (100 mg.), calcium carbonate, magnesium stearate and sugar coating. The said ingredients are mixed and granulated and the granules dried and compressed into tablets.

It is understood that the 2-oxo-1-benzyl-cyclohexane propionic acid derivatives used as active ingredients in the foregoing Examples 11–15 may be replaced by any of the cycloalkane 1-substituted alkanoic acid derivatives described in the specification. Thus compositions suitable for therapeutic purposes are provided employing as active agents 2-oxo-1-(o-methoxy-benzyl)-cyclohexane propionic acid; 2-oxo-1-(o-chlorobenzyl)-cyclohexane propionic acid; 2-hydroxy-1-phenyl-cyclopentane acetic acid or salts or esters thereof as well as other cycloalkane 1-substituted alkanoic acid derivatives of this invention.

We claim:

1. A method for stimulating the flow of bile in animals in need of such stimulation comprising administering daily to said animal from 30 to 900 mg. of a compound selected from the group consisting of (a) a 1-substituted cycloalkane alkanoic acid having the formula

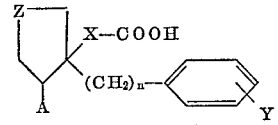

wherein X is a member selected from the group consisting of alkylene chain of from 1 to 4 carbon atoms and alkylene chain of 1 to 4 carbon atoms substituted by lower alkyl, Z is selected from the group consisting of methylene and ethylene, A is selected from the group consisting of ketonic oxygen and hydroxy, Y is selected from the group consisting of hydrogen, chloro, fluoro and alkoxy containing from 1 to 3 carbon atoms in the alkyl group and $n$ is selected from 0 and the integer 1; (b) a therapeutically acceptable salt thereof and (c) nontoxic methyl or ethyl ester thereof.

2. A method as claimed in claim 1 wherein said compound is a therapeutically acceptable salt selected from the group consisting of an alkali metal, alkaline earth metal and diethylamine salt.

3. A method as claimed in claim 1 wherein said compound is 2-oxo-1-benzyl-cyclohexane propionic acid.

4. A method for stimulating the flow of bile in animals in need of such stimulation comprising orally administering daily to said animal from 30 to 900 mg. of a compound selected from the group consisting of 2-oxo-1-benzyl-cyclohexane propionic acid, a therapeutically acceptable salt thereof and methyl or ethyl ester thereof.

5. A method as claimed in claim 4 wherein said compound is the sodium salt of 2-oxo-1-benzyl-cyclohexane propionic acid.

References Cited

Chemical Abstracts (II) 63–14769g (1965) copy in P.O.S.L.

Chemical Abstracts, 58:6134g (March 1963) copy in P.O.S.L.

ALBERT T. MEYERS, *Primary Examiner.*

J. GOLDBERG, *Assistant Examiner.*

U.S. Cl. X.R.

424—305

U.S. DEPARTMENT OF COMMERCE
PATENT OFFICE
Washington, D.C. 20231

UNITED STATES PATENT OFFICE
CERTIFICATE OF CORRECTION

Patent No. 3,439,099                                                             April 15, 1969

Raffaello Fusco et al.

It is certified that error appears in the above identified patent and that said Letters Patent are hereby corrected as shown below:

Column 3, line 61, "soduim" should read -- sodium --. Column 4, line 2, "benzenyl" should read -- benzyl --.

Signed and sealed this 21st day of April 1970.

(SEAL)
Attest:

Edward M. Fletcher, Jr.                            WILLIAM E. SCHUYLER, JR.
Attesting Officer                                              Commissioner of Patents